United States Patent [19]

Polimine

[11] 4,250,350

[45] Feb. 10, 1981

[54] EXPANSION JOINT WITH INTERIOR GROUNDING CONTINUITY BOND

[75] Inventor: Robert F. Polimine, Lynbrook, N.Y.

[73] Assignee: General Signal Corporation, Stamford, Conn.

[21] Appl. No.: 78,261

[22] Filed: Sep. 24, 1979

[51] Int. Cl.³ .......................................... H02G 15/08
[52] U.S. Cl. ....................................... 174/86; 174/13; 174/21 CA; 174/99 E; 174/78
[58] Field of Search ............ 174/13, 21 CA, 78, 84 S, 174/86, 99 E; 339/9 E, 14 L

[56] References Cited

U.S. PATENT DOCUMENTS

| | | | |
|---|---|---|---|
| 3,154,632 | 10/1964 | Browne | 174/78 X |
| 3,783,178 | 1/1974 | Philibert et al. | 174/86 |
| 3,949,152 | 4/1976 | Floessel | 174/21 CA X |

OTHER PUBLICATIONS

"Power Cable Shield Terminator", IBM Tech. Disclosure Bulletin, vol. 11, No. 8, 1/69.

Primary Examiner—Roy N. Envall, Jr.
Attorney, Agent, or Firm—Milton E. Kleinman; George W. Killian

[57] ABSTRACT

To assure safety, an expansion joint in an electrical system must have grounding continuity. A telescoping unit is provided using a braided-conductor bond inside the joint thereby protecting it from ambient contaminants. A high integrity ground continuity is assured even if the conduit is painted or becomes corroded. Selected components are proportioned with respect to each other to assure accurate component alignment with no possibility of relative movement, during assembly, which would endanger ground continuity. Stop means are incorporated in the design to limit the twisting of the grounding jumper during assembly.

8 Claims, 2 Drawing Figures

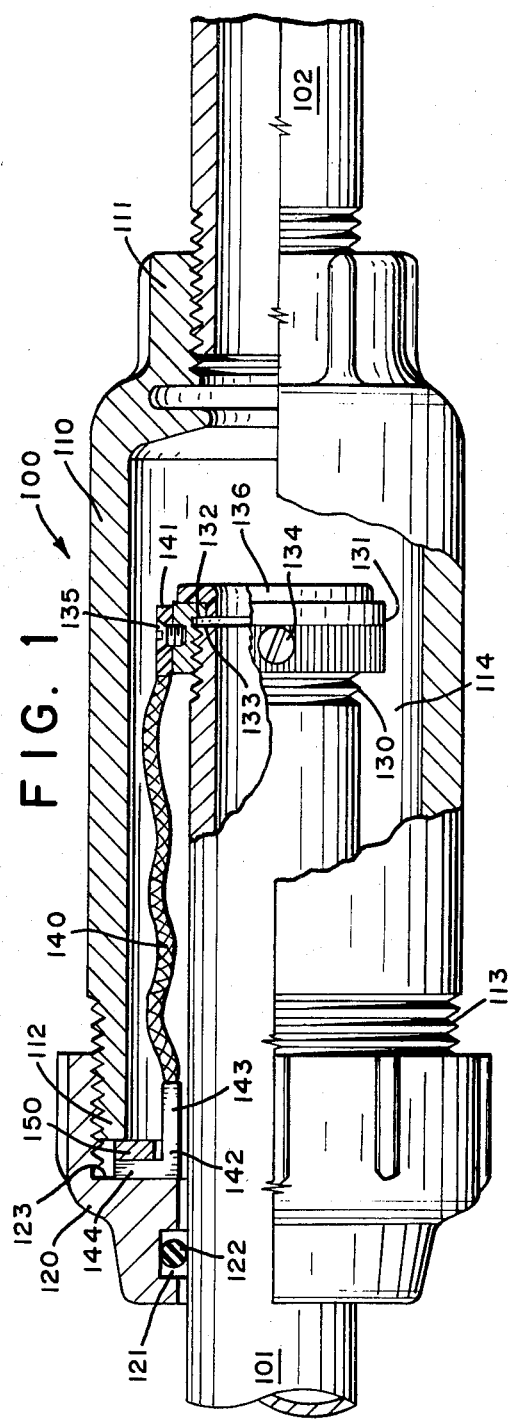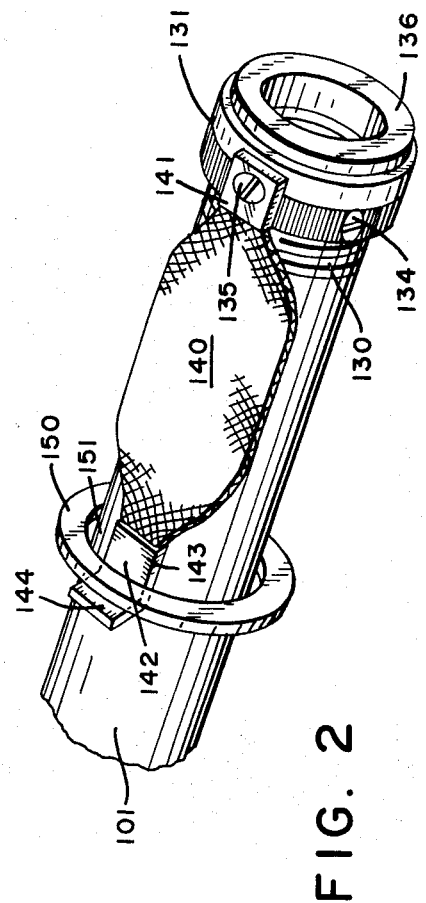
FIG. 1
FIG. 2

EXPANSION JOINT WITH INTERIOR GROUNDING CONTINUITY BOND

In order to provide for the safety of personnel and to reduce the probability of damage to electrical conductors which carry large currents, and deliver substantial power, it is customary to enclose such conductors in a metallic conduit. In order to further reduce the probability of electrical shock to personnel who must work with such equipment it is conventional to connect such conduits to ground potential. More specifically, the conduit is grounded by means of a high integrity circuit which has the capability of carrying sufficient current to trip circuit breakers without thermal damage to the conduit. The high integrity ground must be maintained through conduit joints, meter boxes, junction boxes, expansion joints, distribution boxes, etc. There may be multiple ground connections of the conduit including incidental grounds by contact with grounded metal supporting structures. In order to assure that all sections of a conduit are at ground potential, it is necessary to provide high integrity electrical joints everywhere that two sections of conduit are coupled together. Where standard threaded sleeves are used to join two conduit sections, a high integrity electrical connection is readily obtained. However, in certain locations, and under certain conditions, conduit sections may be subject to wide temperature variations either as a result of the atmosphere or as a result of the heating of the wires within the conduit, in consequence of the current flowing in the wires. In order to prevent the conduits from buckling as a result of thermal, or mechanical, expansion and contraction, it is conventional to provide telescoping, or expansion joints as may be required. Because some type of sliding motion is required for expansion joints, it has been difficult to provide high integrity electrical continuity between the two members which move relative to each other. Typically prior art devices employed a flexible braided jumper which was securely and adequately connected to members on each side of the expansion joint.

Another grounding continuity technique is shown in the Frank L. Browne patent, U.S. Pat. No. 3,154,632, issued Oct. 27, 1964. External bonding jumpers had a tendency to oxidize and/or deteriorate under certain atmospheric conditions. In addition, under selected atmospheric conditions, the conduit with which the copper braid was to make an electrical contact would tend to oxidize thereby reducing the effectiveness and integrity of the electrical connection between the copper braid of the expansion joint and the conduit. Although the conduit in the vicinity of an expansion joint of the Browne variety should not be painted, such conduit was occasionally painted after it was installed. The result was a loss or derogation of electrical continuity from the conduit on one side of the joint to the conduit on the other side thereby creating loss of ground integrity and producing a possible hazard for the operating personnel.

The expansion joint of the present structure has been designed to overcome the difficulties which were inherent in the prior art structures. More specifically, the present structure is designed to assure a high integrity ground from one side to the other of the expansion joint for both indoor and outdoor use. The present structure seals the interior of the telescoping joint from atmospheric conditions. Therefore, the bonding jumper, being internal is not subjected to the deteriorating effect of the atmosphere.

For the purpose of this specification a high integrity ground connection may be defined as a connection which will be maintained irrespective of adverse conditions and which will be capable of conducting any current which the connection may be required to conduct without thermal damage to the connection and/or conduction medium. Furthermore, a high integrity ground connection will meet all the requirements of the National Electrical Code and conventions of the trade.

SUMMARY OF THE INVENTION

The present invention provides an expansion fitting for electrical conduit and includes means for excluding ambient atmospheric conditions from the interior of the expansion joint. Such sealing makes the expansion joint suitable for use both indoors and outdoors. A special grounding jumper which is located in the interior of the expansion joint is employed to maintain a high integrity ground connection which is not subject to derogation resulting from external atmospheric conditions which would oxidize the flexible braided bond. The use of the interior bond assures a high integrity electrical connection even when the telescoping conduit is painted or the surface thereof is oxidized.

An "L" shaped ferrule is connected to one end of the braided bond jumper and placed so that it is compressed between a washer and a shoulder of the head; and these components, together with the associated conduit, are proportioned with respect to each other to assure accurate component alignment with no possibility of the ferrule becoming disengaged and not being compressed between the washer and head shoulder. The elements are designed so that during assembly the amount of twisting of the grounding jumper is held to a minimum.

It is the object of the present invention to provide a new and improved expansion fitting for joining a section of electrical conduit to another member.

It is a more specific object of the invention to provide a new and improved expansion fitting for joining a section of electrical conduit, which may be subject to longitudinal motion, to another member.

It is another object of the invention to provide an expansion fitting of the type described and which maintains a high integrity electrical connection between the conduit and the other member.

It is another object of the invention to provide the high integrity bonding connection by means of a braided bond located in the interior of the expansion joint.

It is another object of the invention to provide an expansion joint wherein the interior is sealed from atmospheric conditions.

It is another more specific object of the invention to provide a grounding means in an electrical expansion joint which is not affected by oxide films or paint on the conduit surface.

It is a particular object of the invention to provide an assembly wherein the various components are retained in their appropriate respective positions to assure a high integrity ground continuity subsequent to final assembly.

It is another object of the invention to provide a structure wherein the internal bonding jumper is subjected to minimum twisting during assembly of the expansion joint.

It is another object of the invention to provide an exansion joint having a high integrity ground continuity which is not affected by dissimilar metals and galvanic reaction.

It is another object of the invention to satisfy the foregoing objects by use of an economical fitting which is convenient and simple to use and assemble and which meets Underwriters Laboratory requirements and those of the National Electric Code.

BRIEF DESCRIPTION OF THE DRAWINGS

FIG. 1 shows a partially cutaway view of one form of an expansion joint utilizing the present invention for connecting two sections of rigid conduit which may move longitudinally with respect to each other;

FIG. 2 constitutes a perspective view of selected components which fit within the interior of the body member.

Like elements in the different views are given the same numerical designators.

DESCRIPTION OF THE PREFERRED EMBODIMENTS

It is believed that the invention, together with its structural parts and their interaction one with the other, can best be understood from a consideration of the drawing taken together with the following specification.

Considering now more specifically the structure shown in FIG. 1, there will be seen an expansion fitting designated generally as 100 illustrated in partial cross section. The expansion fitting 100 serves for coupling together two sections of rigid conduit designated as 101 and 102. It should be understood that a modified version of the expansion fitting 100 could be employed for coupling a section of rigid conduit 101 to some other member, such as, a wall member (not shown) instead of to a second section of rigid conduit 102. The expansion fitting 100 includes a generally cylindrical body section 110 which at the right hand end 111, as viewed in FIG. 1, is suitably formed and threaded to facilitate connection of threaded rigid conduit 102. Or, as suggested, the right end 111 of body section 110 may be modified in form to expedite joining the body section 110 to some other member as may be expedient. The method of joining the conduit 102, or other member, to the end 111 of the body section 110 will normally comprise a technique which does not permit relative longitudinal motion between the two elements after the joining has been completed. Such technique may involve a threaded fitting as shown in FIG. 1 but could comprise any suitable form of compression fitting, welding, soldering or braising, etc. If relative longitudinal motion between the body section 110 and the member 102 is required, the coupling at the end 111 of the body section 110 could be of the same general character as the type to be described with respect to the left hand 112 of the body section 110.

The end 112 of the body section 110 has threads 113 to facilitate the coupling of the head 120 to the body section 110. As may be seen the head member 120 has a first recessed area 121 which is provided for the installation of an 0-ring 122 which may be coated with a rubber lubricant or grease. The dimension of the recess 121 and the 0-ring 122 inserted therein are such that when a section of rigid conduit 101 is inserted through the opening of the head 120 there will be a sealing connection between the 0-ring 122 and the conduit 101 for excluding water and/or atmospheric contaminants from entering the interior of the body section 110 from the left end 112. As may be seen in FIG. 1, the recess 121 has a dimension parallel to the longitudinal axis of the rigid conduit 101 which is greater than the diameter of the material of the 0-ring 122 in order to facilitate compression and/or rolling motion of the 0-ring 122 in response to relative longitudinal motion between the rigid conduit 101 and the head 120 which is coupled to the body section 110. As may be seen in FIG. 1, the head 120 is provided within its interior with a wide, flat, smooth shoulder stop 123 which serves as a bearing surface and electrical contact point to be described more fully hereinafter.

As may be seen in FIG. 1, the conduit 101 has threads 130 at its right hand end and a bushing 131 is threaded onto the conduit 101. The bushing 131 is tightened securely onto the conduit 101 until the threaded end 130 of the conduit 101 bottoms against the internal metallic shoulder stop 132 of the bushing 131. In FIG. 1 the bushing 131 is illustrated just before the shoulder stop 132 comes in contact with the end 133 of the threads 130. After the bushings 131 is secured to the conduit 101 it may be locked in place against rotation by screw 134 which is threaded into bushing 131 and contacts the threads 130 to prevent rotation of the bushing 131 with respect to the conduit member 101. An additional screw 135 which serves a function to be described more fully hereinafter is also threaded into the bushing 131. However, its length is such that it will not contact the threads 130. The bushing 131 threaded to the conduit 101 makes good electrical contact therewith and the contact is enhanced by the screw 140.

In addition to the function that the bushing 131 serves in connection with the grounding circuit, it also serves to protect the wires (not shown) which are inside the conduit 101 and extend through the body section 110 to the conduit 102. That is, the bushing 131 serves to protect the wires from any sharp edges which may exist on the end of conduit 101 which includes the threads 130. In addition, the bushing 131 normally includes a nonmetallic member 136 which also helps to protect the wires.

Within the body section 110 there is an electrical bond 140 which preferably comprises a conductor made of flexible copper braid and which serves to provide grounding electrical continuity from the conduit 101 to the conduit 102 or other member. Securely anchored to the bond 140 is a ferrule 141 which is appropriately sized and configured to make a good electrical contact with the bushing 131 when the ferrule 141 is secured to the bushing 131 by the screw 135. At the left end of the bond 140, as viewed in the figures, is a second ferrule 142 which preferably has a generally "L" shaped configuration comprising legs 143 and 144. The ferrule 142 is preferably permanently secured to the bond 140 by any suitable means which provides good electrical contact therebetween.

As may be readily comprehended by an examination of FIGS. 1 and 2, the expansion joint 100 is assembled by first fitting the head 120 on the conduit 101. Next, a washer 150, to be described more fully hereinafter is slipped over the threaded end of the conduit 101. In FIG. 1 the bushing 131 is not illustrated as fully engaged with the conduit threads 130 as the shoulder 132 is not in contact with the ends 133 of threads 130. After the bushing 131 is secured to the conduit 101 until the shoulder 132 of the bushing butts against the end 133 of the threads 130, the screw 134 is tightened to enhance the electrical circuit between the bushing 131 and the conduit 101 and to prevent relative rotation between these members. Subsequently, the bond 140 is secured to the bushing 131 by inserting the screw 135 through a hole in the ferrule 141 to secure the ferrule 141 to the bushing 131. The ferrule 141 is made of an appropriate material and properly sized and configured to provide a good electrical bond between the ferrule 141 and the bushing 131. Finally, the flexible bond 140 is flexed in a manner such that the ferrule 142 may have its leg 144 slipped in the open space 151 between the washer 150 and the conduit 101. Then the ferrule 140 is turned back to the position as shown in FIGS. 1 and 2.

It should be understood that the sizes and proportion of the ferrule 140 and the washer 150 are chosen and designed to fit the assembly as described and so that the parts will be retained in their desired relative position during and subsequent to assembly.

With the parts assembled as described, the head 130 is moved toward the body section 110 and threaded on the threads 113. It will be seen that the washer 150 will prevent the ferrule 142 from slipping into the interior of the body section 110. That is, the internal diameter of the washer 150 and the outer diameter of the conduit 101 produce a spacing 151 which is just large enough to pass the short end 143 of the ferrule 142 therethrough. Without the washer 150, the ferrule 142 would have a tendency to fall into the interior of the body section 110 upon tightening of the head 120. In addition. it will also be seen that the washer 150 provides a wide, flat and smooth bearing surface for the leg 144 of the ferrule 142. Typically the body section 110 is made from a sand casting and the wall thickness of the body section 110 at the end of the thread 113 may not be of uniform thickness. However, the washer 150 makes pressure contact throughout the entire circumference with the left end of the body section 110. In addition, as previously mentioned, the short leg 144 of the ferrule 142 is compressed between the shoulder stop 123 and the washer 150. Accordingly, there is good electrical continuity between the ferrule 142 and the head 120. Furthermore, the head 120 is in good electrical contact with the body section 110 through the threaded members 113. Accordingly, it will be seen that there is good electrical continuity from the conduit 101 to the conduit 102 or other member. The grounding circuit is from the conduit 101 to the bushing 131, to the ferrule 141, to the bonding strap 140, to the ferrule 142, and thence through the washer 140 and/or the head 120 to the body section 110 which in turn is in good electrical contact with the associated member 102.

Experience has shown that as the head 120 is tightened on the body section 110, the shoulder stop 123 slides on the ferrule leg 143 and there is minimal tendency to twist the bond 140. Also, although the conduit section 101 may experience longitudinal motion relative to the body section 110, there is little if any rotational motion of these two members with respect to each other. In response to longitudinal motion between the conduit 101 and the body section 110 such as to withdraw the conduit 101 from the body section 110, the flexible bond 140 will tend to widen at its mid-section as illustrated in FIG. 2.

Multiple bonds could be used or a special bushing could be used with the bond coupled directly thereto, thereby obviating the need for a coupling ferrule 141, and screw 135.

As is well known to those who are familiar with electrical expansion fittings, the conduit 101 may be fabricated of a wide variety of metal. For example, the conduit 101 may be made of rolled steel which is galvanized, or it may be fabricated of aluminum or copper alloy. Some metals of which the conduit 101 may be fabricated have a tendency to form an oxide which makes it difficult to achieve a high integrity electrical contact between the conduit 101 and the head 120 by means of prior art grounding devices. As will be seen, the present structure does not depend upon an ability to make the required electrical contact by means of a scraping or pressure member. Although the conduit 101 should not be painted in the vicinity of an expansion fitting it will occasionally happen that the conduit will be painted for corrosion protection or possibly for color coding to indicate the nature or function of the wires contained therein, or just for aesthetic purposes. Such painting will not adversely affect the integrity of the ground continuity through the expansion fitting of the present invention.

While there has been shown and described what is considered at present to be preferred embodiments of the invention, modifications will readily occur to those who comprehend the problem and the concepts of the invention.

For example, it will be evident that proportions may be varied, or other modifications made, to meet the exigencies of the problem at hand. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An electrical fitting expansion joint having high integrity grounding continuity and comprising in combination:
   (a) a body member having first and second ends and having a through longitudinal interior opening and provided with means for coupling said first end of said body member to another member with electrical continuity therebetween;
   (b) a conduit bushing sized to fit within said interior opening of said body member;
   (c) a longitudinal, flexible conductor having first and second ends with said first end coupled to said conduit bushing;
   (d) a rigid and generally "L" shaped ferrule like member coupled to said second end of said flexible conductor;
   (e) a washer having a first side in cooperative relationship with said ferrule like member and sized so that a second side will concurrently mate with said second end of said body member; and
   (f) a head member having an internal shoulder for contacting one leg of said ferrule member and pressing it in contact with said first side of said washer and for thereby pressing said second side of said washer into contact with said second end of said body member when said head member is coupled to said second end of said body member; whereby a conduit coupled to said conduit bushing and extending from the interior opening of said body member through said washer and said head member would have electrical continuity to said first end of said body member with the path extending from said first end of said body member to said second end of said body member to said washer to said ferrule to said flexible conductor coupled to said conduit bushing.

2. The combination as set forth in claim 1 wherein said flexible conductor comprises flexible copper braid.

3. The combination as set forth in claim 1 wherein said washer has an internal opening sized to pass a conduit which, in turn, is sized to be coupled to said conduit bushing while one leg of the "L" of said ferrule extends through said internal opening.

4. The combination as set forth in claim 3 wherein:
 (a) the interior opening of said body member;
 (b) the legs of the "L" of said ferrule; and
 (c) the internal opening of said washer are so proportioned with respect to each other that said ferrule cannot escape from engagement with said washer when an appropriately sized conduit is passed through said washer and said head member is coupled to said body member.

5. The combination as set forth in claim 4 wherein said head member includes a recess for accommodating an O-ring.

6. The combination as set forth in claim 5 wherein said flexible conductor comprises flexible metallic braid.

7. The combination as set forth in claim 5 wherein said bushing includes:
 (a) threads for coupling said bushing to a conduit section; and
 (b) locking means for securing said bushing to a conduit section for inhibiting relative rotation between said bushing and a conduit section coupled thereto.

8. The combination as set forth in claim 7 wherein said locking means comprises a set screw.

* * * * *